United States Patent Office 3,661,835
Patented May 9, 1972

3,661,835
PROCESS FOR PREPARING A DISPERSION OF SPHERICAL AGGREGATES OF AMPHIPATHIC POLYMER
Alan Stuart Baker, George Green, and Julian Alfred Waters, Maidenhead, England, assignors to Imperial Chemical Industries Limited, London, England
No Drawing. Filed Aug. 7, 1970, Ser. No. 62,127
Claims priority, application Great Britain, Aug. 14, 1969, 40,644/69
Int. Cl. C08j 1/46
U.S. Cl. 260—34.2
6 Claims

ABSTRACT OF THE DISCLOSURE

Process of preparing dispersions containing spherical aggregates of amphipathic copolymer in which the copolymer is dissolved in a common solvent for two different polymeric components of the copolymer and constituents of this solvent are removed by distillation to leave a solvent for only one of the components. The dispersions are useful in coatings.

BACKGROUND OF INVENTION

This invention relates to a process of preparing dispersions of amphipathic copolymer aggregates, and to the dispersions prepared by this process.

By an amphipathic copolymer we mean a graft or block copolymer in which there are at least two polymeric components having such differences in their chemical nature that they differ significantly from each other in their solubility characteristics. A common solvent is defined as a liquid or mixture of liquids which is a good solvent for all polymeric components of an amphipathic copolymer; and a hemi-solvent is defined as a liquid or mixture of liquids which is a good solvent for one polymeric component and a non-solvent or precipitant for another polymeric component of an amphipathic copolymer. By a good solvent we mean a solvent which is better than a thetasolvent and the nature of a theta solvent is discussed at pages IV–163–166 of "Polymer Handbook" (Ed. Brandrup and Immergut, Interscience 1966).

Amphiphathic copolymers normally exist in hemisolvents in the form of aggregates in which the insoluble components cluster together to form a core which is surrounded by their associated soluble components. Under suitable circumstances, dispersions of these aggregates are low in viscosity and are particularly suitable for use in the formulation of coating compositions. We believe that low viscosity dispersions result when such molecular aggregates are stable, and approximately spherical.

When sufficient non-solvent or hemi-solvent is added to a solution of an amphipathic copolymer in a common solvent so that the environment is converted into a hemisolvent, the resulting aggregates of copolymer are commonly large and irregular in size and shape and may take the form of massive rod-like or laminar structures, because of the drastic and uncontrolled modification of the environment. These structures give dispersions having undesirable rheological properties for certain applications, such as in coating compositions.

We have now discovered a process whereby dispersions of amphipathic copolymers, in which we believe the molecular aggregates exist predominantly in spherical form, can be readily and controllably prepared in a hemi-solvent environment.

SUMMARY OF THE INVENTION

According to the invention we provide a process of preparing in a hemi-solvent as herein defined a dispersion of substantially spherical aggregates of amphipathic copolymer which comprises dissolving the copolymer in a common solvent as herein defined consisting of a mixture of liquids of differing volatility, then distilling off a part of the liquid mixture, optionally under reduced pressure, to leave a hemi-solvent, the proportion of copolymer which is dissolved in the common solvent being such that on cooling the hemi-solvent to a temperature below the environmental glass transition temperature as herein defined of the insoluble component of the copolymer in the hemi-solvent, the final mixture of copolymer and hemi-solvent is completely miscible with added hemi-solvent which has substantially the same composition as that present in the final mixture. At the stage of transition from common solvent to hemi-solvent the insoluble components of the copolymers aggregate, and the copolymer must then be in such concentration that on cooling to a temperature below the environmental glass transition temperature of the insoluble component the insoluble components do not become grossly entangled. Gross entanglement at this stage is indicated when on the addition of further hemi-solvent to the final mixture of hemisolvent and copolymer, there is immiscibility, the formation of distinct phases and general instability. As a result of the gradual and controlled homogeneous change from a common solvent to a hemi-solvent environment, we find that the formation of dispersions of spherical aggregates is strongly favoured.

We believe that at the point in the change in solvency from common solvent to hemi-solvent, at which the aggregation of the insoluble components of the amphipathic copolymers first commences, the insoluble components cluster together to form a core which will normally be liquid and mobile. Under these circumstances the aggregates have the character of micelles and will be in equilibrium with individual molecules of amphiphathic copolymer in continuous phase. For some purposes micellar dispersions of this type may have desirable properties, but it is preferred in our invention that the environment should be further changed so that the insoluble component is below its environmental glass transition temperature ($T_g$) in the further-changed environment. This further change may involve further removal of a volatile solvent constituent of the liquid mixture, so raising the $T_g$ of the insoluble component in the environment. Alternatively, if the initial change in solvency of the liquid mixture is carried out at an elevated temperature, the temperature of the changed liquid may be reduced to below the $T_g$ of the insoluble component in the environment, this $T_g$ preferably being higher than ambient temperature.

Such an aggregate with a solidified core, i.e. a core comprising insoluble components below their $T_g$, has a permanent identity and considerable mechanical strength and we prefer to call this a micro-particle as opposed to a micelle. It is in this form that the dispersions of this invention are particularly useful in coating compositions.

There is a maximum permissible concentration of dissolved copolymer at the stage at which transition from a common solvent to a hemi-solvent environment occurs (at which stage aggregation of the insoluble components occurs) if there is to be obtained an ultimate dispersion of low viscosity containing micelles or micro-particles of which a high proportion are spherical. Above this maximum concentration we believe that the formation of spherical micelles or micro-particles is hindered and that large irregular aggregates, which may be of rod-like or laminar form, are produced which are not miscible on dilution with further hemi-solvent, distinct phases being formed. The permissible maximum concentration can readily be determined by observing the ultimate dispersion viscosity and bearing in mind that a lower viscosity indicates that a higher proportion of the micelles or microparticles present are spherical. The exact value of this maximum concentration will depend on the molecular weight and structure of the amphipathic copolymer. Where the molecular weight of the copolymer is of the order of 10,000, the maximum concentration is about 45% by weight while on the other hand for a molecular weight of 100,000 it may be as low as 5% by weight. It is believed that only below the upper limit of concentration can gross entanglement of the insoluble components be avoided during their aggregation.

Because of the relatively low solids content at which the preferred spherical micro-particles must in some circumstances be formed it is often preferable to arrange that there is present in the hemi-solvent mixture after the micro-particles have been formed some constituent which can be at least partially removed by distillation whilst still leaving a hemi-solvent environment. Thus, by at least partially removing this constituent, more concentrated dispersions of micro-particles can be prepared. It is further desirable, when it is intended that the final solids concentration of the dispersion be relatively high compared to the maximum permissible concentration for the common solvent-hemi-solvent transition described above, that the concentration stage be carried out under such conditions of temperature and solvency that the cores of the micro-particles remain in the solidified rather than the mobile state, otherwise there may be re-arrangement from the preferred spherical micro-particles form into alternative structures which give higher viscosity.

Dispersions of micro-particles may be diluted indefinitely with the same hemi-solvent or similar hemi-solvent liquids whilst retaining miscibility and without losing stability.

The amphipathic copolymer should contain at least 5% by weight of each of two types of polymeric component which have different solubility characteristics and preferably at least 20% of each such component by weight. In the amphipathic copolymer molecule each such component is in the form of at least one polymeric segment of molecular weight at least 500. Further the amphipathic copolymer, when prepared, should preferably be substantially free from polymer species which are wholly insoluble in the final hemi-solvent environment.

The higher the weight proportion of the insoluble component, the larger will be the size of the micro-particles formed. Also the optimum conditions of formation become more difficult, that is, the maximum permissible concentration at which the micro-particles can be formed, as discussed above, is not only reduced as the molecular weight of the molecules comprising the micro-particles is increased, but at a given molecular weight it is also reduced at higher ratios of insoluble to soluble components. Where for example, the amphipathic copolymer has a molecular weight of 30,000, the maximum permissible concentration may be as high as 45% by weight when the ratio of insoluble components to soluble components is 1:1. But at the same molecular weight where the ratio of insoluble components to soluble components is 3:1, the maximum permissible concentration may be as low as 10% by weight. Proportions of soluble component greater than 80% of the total polymer, are unsuitable in that it is difficult to find conditions in which aggregation of the small insoluble components is strong enough to give permanent identity to the micro-particles, and even under these conditions substantial quantities of the amphipathic copolymer may exist in molecular solution rather than aggregated into the form of micro-particles.

In the case of a graft copolymer in which a multiplicity of soluble components is attached along a single insoluble backbone component, the total weight of soluble component which is acceptable, should not exceed 85% by weight of the total molecule and should preferably not exceed 67%. Further the number of such segments of soluble component per average molecule should not exceed 50 and preferably should not exceed 30. These large numbers of segments of soluble component per average molecule may only be tolerated where the ratio of insoluble to soluble components is significantly greater than 1:1. For example, for ratios equal to or less than 1:1, the maximum number of segments of soluble component each having a molecular weight of 2,000 say, should not exceed 20 and preferably not exceed 10. Within the above limits there is no upper limit for the total molecular weight of the two components, although it is preferred not to exceed a total molecular weight of 200,000.

In selecting suitable common solvents and hemi-solvents for any given amphipathic copolymer, it is necessary to appreciate that the difference in solubility of the two components will generally derive from differences in polarity. Therefore, the principle to be observed is that "like dissolves like"; that is, polar polymeric components are dissolved by liquids of similar polarity, while non-polar polymeric components are dissolved by non-polar liquids. Those liquids which will or will not dissolve polymeric components of given polarity are well known to those skilled in the art and are illustrated for example in British Pat. No. 1,052,241 and at pages IV–185–234 of "Polymer Handbook" (Ed. Brandrup and Immergut, Interscience 1966).

For example, non-polar liquids such as aliphatic or cyclicaliphatic hydrocarbons or long chain alcohols will dissolve non-polar polymeric components such as:

a copolymer of ethylene, propylene or vinyl stearate
a polymer of an ester of a long chain alcohol with acrylic or methacrylic acids
a polyester derived from a long chain hydroxy carboxylic acid but will not dissolve polar polymeric components, such as:

a polymer of an ester of a short chain alcohol with acrylic or methacrylic acid
a polyester of a short chain hydroxy carboxylic acid
polyvinyl chloride
polyacrylonitrile Conversely, polar liquids will not dissolve non-polar polymeric components such as those listed above, but they will dissolve polar polymeric components such as those listed above.

The preparation of graft or block copolymers is well known to those skilled in the art and reference may be made, for example, to British patent specification No, 1,122,397, to "Graft Copolymers" (Battaerd and Tregear, Interscience 1967) and to "Copolymerisation" (Ham, Interscience, 1964).

The invention is illustrated by the following examples in which parts and percentages are by weight unless otherwise stated:

Example 1

In this example, there was employed an amphipathic graft copolymer having a backbone of poly(methyl methacrylate) (a polar polymeric component) and side-chains of poly(12-hydroxy stearic acid) (a non-polar polymeric component) in a weight ratio of 50/50. The molecular weight of the copolymer was approximately 30,000 determined by gel permeation chromatography, and of the side-chains approximately 1700. The average number of side-chains per molecule was 9.

To a solution of 47.5 parts of the above graft copolymer in 152.5 parts of ethyl acetate were added 110 parts of aliphatic hydrocarbon (B.P. 200° C.) to produce a clear solution. At this stage, the polymer concentration was 15% by weight and both polymeric components were soluble in the mixture of ester and hydrocarbon. The ethyl acetate was then substantially removed by distillation to leave hydrocarbon which was a good solvent for the poly(12-hydroxystearic acid) components but not for the poly(methyl methacrylate) components. During the distillation of the ethyl acetate the amphipathic copolymer formed miscelles, the poly(methyl methacrylate) providing, the core, and on cooling to ambient temperature micro-particles were formed, the $T_g$ of the poly(methyl methcrylate) in the hydrocarbon environment being about 100° C.

The resulting dispersion had a polymer content of 30% by weight and a near-Newtonian viscosity of 0.2 poise at 25° C., and was completely miscible on dilution with an increasing volume of the above aliphatic hydrocarbon.

Example 2

In this example there was employed an amphipathic graft copolymer having a backbone of poly(methyl methacrylate) and side-chains of poly(12-hydroxystearic acid) in a weight ratio of 75/25 respectively. The molecular weight of the copolymer was aproximately 56,000 and of the side-chains approximately 1,700. The average number of side-chains per molecule was 8.

85.8 parts of a solution of the above graft copolymer (46.6% solids content in ethyl acetate) were mixed with 270 parts of benzene and 394 parts of ethyl acetate. The mixture was warmed to produce a clear solution. 427.4 parts of medium-boiling (boiling point approximately 110° C.) aliphatic hydrocarbon and 60 parts of high-boiling aliphatic hydrocarbon (boiling point approximately 200° C.) were added to the solution which remained clear. Thus at this stage the polymer content was 3.2% by weight and both polymeric components were soluble in the solvent mixture. The ethyl acetate and benzene were then removed by distillation to leave a mixture of hydrocarbon which was a good solvent for the poly(12-hydroxystearic acid) component but not for the poly(methyl methacrylate) component. During this distillation spherical micelles of copolymer were formed of which the poly(methyl methacrylate) components provided the core. This dispersion was cooled to 80° C. and the resulting micro-particles concentrated by removing medium-boiling aliphatic hydrocarbon by distillation at reduced pressure at temperatures below 80° C. with stirring. A stream of nitrogen assisted the removal of residual medium-boiling aliphatic hydrocarbon.

The resulting dispersion of spherical micro-particles had a polymer content of 39.8% by weight and a viscosity of approximately 2 poise at 26° C., and was completely miscible at room temperature on dilution with an increasing volume of a mixture of the above aliphatic hydrocarbons.

A solution of the same graft copolymer in ethyl acetate at a polymer content of 40%, had a viscosity of approximately 900 poise (measured at the same temperature and rate of shear).

When an attempt was made to produce a low viscosity dispersion of micro-particles from the same graft copolymer (which had a high ration of insoluble to soluble component) but employing a higher concentration of polymer at the stage of transition from common solvent to hemi-solvent, i.e. the same concentration as in Example 1, the product, had the appearance of a gelatinous solid. It has a very high viscosity and was immiscible at room temperature with the mixture of aliphatic hydrocarbons used above, two distinct phases being formed. This illustrates the need to determine for a given copolymer the maximum concentration of copolymer which is permissible during the transition if a high proportion of spherical aggregates is to be produced.

Example 3

In this example there was employed an amphipathic graft copolymer having a backbone of poly(methyl methacrylate) and side-chains of poly(12-hydroxystearic acid) in a weight ratio of 80/20 respectively. The molecular weight of the copolymer was approximately 30,000 and of the side-chains was approximately 3,000. Thus the average number of side-chains per molecule was 2.

100 parts of a solution of the above graft copolymer (61.5% solids content in ethyl acetate) were mixed with 3,000 parts of benzene. The mixture was warmed to produce a clear solution. A mixture of 600 parts of medium-boiling (B.P. approximately 110° C.) aliphatic hydrocarbon and 61 parts of high-boiling (B.P. approximately 200° C.) aliphatic hydrocarbon was added to the solution which remained clear. Thus the polymer concentration at this stage was 1.6% by weight and both polymeric components were soluble in the solvent mixture. The ethyl acetate and benzene were then removed by distillation to leave hydrocarbon which was a good solvent for the poly(12-hydroxystearic acid) component but not for the poly(methyl methacrylate) component, and spherical micelles were formed during the distillation. Then most of the medium boiling aliphatic hydrocarbon was removed by distillation under reduced pressure at temperatures below 80° C. in order to obtain a more highly concentrated dispersion of micro-particles.

The resulting dispersion had a polymer content of 38.5% by weight and a viscosity of approximately 2 poise at 25° C., and was completely miscible at room temperature and stable when diluted with an increasing volume of a mixture of the medium and high-boiling aliphatic hydrocarbons. Measured at the same rate of shear and temperature, the viscosity of a solution of the same graft copolymer in ethyl acetate, at the same concentration, was higher than 20 poise.

Example 4

In this example there was employed an amphipathic ABA block copolymer in which the A component was poly(2-ethyl hexyl methcrylate) of approximately 5,000 molecular weight and the B component was poly(methyl methacrylate) of approximately 10,000 molecular weight. There were 2 segments of component A per molecule.

100 parts of a solution of the above block polymer (48% solids content in ethyl acetate) were mixed with 2,350 parts of benzene. To the solution was added a mixture of 432 parts of medium-boiling (B.P. approximately 110° C.) aliphatic hydrocarbon and 48 parts of high-boiling (B.P. approximately 200° C.) aliphatic hydrocarbon to produce a clear solution. At this stage, the polymer concentration was 1.6% by weight and both A and B components were soluble in the solvent mixture. Then the ethyl acetate and benzene were removed by distillation to leave a hydrocarbon mixture which was a good solvent for the A component but not for the B component. During this distillation spherical micelles were formed. This dispersion was cooled to 80° C. and the resulting micro-particles concentrated by removing most of the medium-boiling hydrocarbon at reduced pressure at temperatures lower than 80° C., with stirring.

The resulting dispersion had a polymer content of 38% by weight and a viscosity of 4.5 poise at 25° C. (measured at a high shear rate), and was completely miscible when diluted with an increasing volume of the mixture of aliphatic hydrocarbons.

Example 5

In this example there was employed an amphipathic graft copolymer having a backbone of poly(methyl methacrylate) and side-chains of poly(lauryl methacrylate) in a weight ratio of 50/50. The molecular weight of the copolymer was approximately 50,000 and of the side chains approximately 5,000. Thus the average number of side-chains per molecule was 5.

100 parts of a solution of the above graft copolymer (49% solids content in ethyl acetate) were mixed with 200 parts of benzene. To the solution was added 75 parts of high boiling (B,P, approximately 200° C.) aliphatic hydrocarbon and 18 parts of medium-boiling aliphatic hydrocarbon (B.P. approximately 110° C.). Thus at this stage the polymer concentration was 12% and both polymeric components were soluble in the solvent mixture. Ethyl acetate and benzene were then removed by distillation to leave a hemi-solvent. The resulting dispersion was cooled to 80° C. and the micro-particles concentrated by removing the medium-boiling aliphatic hydrocarbon by distillation under reduced pressure at temperatures below 80° C.

The resulting dispersion had a polymer content of 40% and had a near-Newtonian viscosity of approximately 0.2 poise at 25° C., and was completely miscible on dilution with the mixture of aliphatic hydrocarbons.

Example 6

In this example there was employed an amphipathic graft copolymer having a backbone of poly(methyl methacrylate) and side-chains of poly(12-hydroxystearic acid) in a weight ratio of 75/25 respectively. The molecular weight of the copolymer was approximately 56,000 and of the side-chains approximately 1,700. Thus one average there were 8 side-chains per molecule.

85.1 parts of a solution of the above graft copolymer (46.6% solids content in ethyl acetate) were mixed with 171 parts of benzene and 510 parts of ethyl acetate. The mixture was warmed to produce a clear solution. A mixture of 330 parts of medium-boiling aliphatic hydrocarbon (B.P. approximately 110° C.) and 93 parts of olive oil was added to the solution which remained clear. Thus at this stage, the polymer concentration was 3.3% by weight and both the backbone and the side-chains of the copolymer wer soluble in the solvent mixture. The ethyl acetate and benzene were then removed by distillation to leave a hemi-solvent. The resulting dispersion was cooled at 80° C. and the micro-particles concentrated by removing medium-boiling aliphatic hydrocarbon by distillation under reduced pressure below 80° C.

The resulting dispersion had a polymer content of approximately 30% by weight and a non-volatile content of 100%. The dispersion had a viscosity of about 10 poise at 25° C. (measured at a high rate of shear) and was completely miscible on dilution with the mitxure of aliphatic hydrocarbons.

Example 7

In this example there was employed an amphipathic graft copolymer having (1) a backbone of a random copolymer of methyl methacrylate and acrylic acid in the ration of 1:1, and (2) side-chains of poly(12-hydroxystearic acid), in a ratio of 50/50. The molecular weight of the copolymer was approximately 15,000 and of the side-chains was approximately 1,700. Thus the average number of side-chains per molecule was 4.

100 parts of a solution of the above copolymer (48.5% solids content in 1:1 benzene/ethanol mixture) were mixed with 75 parts of ethanol and 75 parts of benzene. The mixture was warmed to produce a clear solution. 194 parts of butyl acetate were added to the solution which remained clear. Thus at this stage, the polymer concentration was 11% and both the backbone and the side-chains of the copolymer were soluble in the solvent mixture. Then benzene and ethanol were removed by distillation with stirring to leave a hemi-solvent, the $T_g$ of the backbone component in butyl acetate being approximately 100° C.

The resulting dispersion of micro-particles had a polymer content of approximately 36% by weight. The dispersion had a viscosity of approximately 2.5 poise at 25° C. (measured at a high rate of shear) and was completely miscible on dilution with butyl acetate. A solution of the same graft copolymer at the same concentration in a 1:1 benzene/ethanol mixture, had a viscosity of approximately 6 poise at 25° C.

Example 8

In this example there was employed an amphipathic graft copolymer having a backbone of poly(acrylic acid) and side-chains of poly(12-hydroxystearic acid) in a weight of 35/65 respectively. The molecular weight of the copolymer was approximately 10,000 and of the side-chains approximately 1,700. Thus the average number of side-chains per molecule was about 4.

50 parts of a solution of the above graft copolymer (44.6% solids content in a 1:1 ethanol/toluene mixture) were mixed with 32.2 parts of ethanol, 32.2 parts of toluene and 89.3 parts of buytl acetate to produce a clear solution. Thus at this stage, the polymer concentration was 11% by weight and both polymeric components were soluble in the solvent mixture.

The ethanol and toluene and some of the butyl acetate were removed by distillation with stirring to leave a hemi-solvent, the $T_g$ of the backbone component in butyl acetate being greater than 100° C.

The resulting dispersion of micro-particles had a polymer content of 41.5% by weight and a viscosity of 1.5 poise (measured at a high shear rate) at 26° C. and was completely miscible on dilution with butyl acetate.

A solution of the same graft copolymer in a 1:1 ethanol/toluene mixture, at the same concentration, had a viscosity of 8 poise (measured at the same shear rate).

Example 9

In this example there was employed an amphipathic graft copolymer having a backbone of poly(methyl methacrylate) carrying side-chains of a copolyester of 12-hydroxystearic acid and dimethylol propionic acid in the ratio 3.3:1 by weight. The ratio of backbone to side-chains was 60:40. The molecular weight of the copolymer was approximately 15,000 and of the side-chains approximately 1,600. Hence the average number of side-chains per molecule was 4.

70 parts of a solution of the above graft copolymer (51% solids content in ethyl acetate) was mixed with 210 parts of ethyl acetate. The mixture was warmed to produce a clear solution. 35 parts of high boiling aliphatic hydrocarbon (B.P. approximately 200° C.) and 35 parts of nonanol were added to the solution which remained clear. Thus at this stage, the polymer content was 10%. The ethyl acetate was substantially removed by distillation to leave a hemi-solvent.

When the nonanol was replaced in this example by an equal weight of high-boiling aliphatic hydrocarbon, a stable dispersion of low viscosity could not be produced. The resulting dispersion had a polymer content of 32% and a viscosity of 0.6 poise (measured at a high rate of shear) at 26° C., and was completely miscible on dilution with a mixture of equal parts of nonanol and the boiling aliphatic hydrocarbon.

What we claim is:

1. A process of preparing a dispersion of (a) substantially spherical aggregates of amphipathic graft or block copolymer, the copolymer containing at least 5% by weight of each of two polymeric components having molecular weights of at least 500 and differing significantly from each other in their solubility characteristics and, where the copolymer consists of a multiplicity of soluble components attached to a single insoluble backbone, the total weight of such components not exceeding 85% of that of the total molecule and the number thereof per average molecule not exceeding 50, the number of soluble components per average molecule not exceeding 20 where the weight ratio of insoluble to soluble components is equal to or less than 1:1, in a (b) liquid or mixture of liquids which is a good solvent for one polymeric component and a non-solvent or precipitant for another polymeric component of the amphipathic copolymer and which is defined as a hemi-solvent the process comprising dissolving the said amphipathic copolymer in a mixture of liquids of differing volatility which is a good solvent for all polymeric components of the amphipathic copolymer and is defined as a common solvent, then distilling off a part of the liquid, optionally under reduced pressure, to leave a hemi-solvent, the concentration of copolymer in the common solvent in which it is dissolved being not higher than 45% by weight and being such that on cooling the hemi-solvent to a temperature below the environmental glass transition temperature of the insoluble component of the copolymer in the hemi-solvent, the final mixture of copolymer and hemi-solvent is completely miscible with added hemi-solvent which has substantially the the same composition as that present in the final mixture.

2. A process according to claim 1 wherein the temperature of the hemi-solvent is reduced to a temperature below the environment glass transition temperature of the insoluble component of the amphipathic copolymer in the hemi-solvent.

3. A process according to claim 1 wherein the environmental glass transition temperature of the insoluble component of the amphipathic copolymer in the hemi-solvent is raised by distillation of a further part of the mixture of liquids to form a different hemi-solvent.

4. A process according to claim 1 wherein after the dispersion is formed it is concentrated by further distillation of a part of the liquid at a temperature below the environmental glass transition temperature of the insoluble component, the continuous phase of the dispersion remaining a hemi-solvent.

5. A process according to claim 1 wherein the amphipathic copolymer contains at least 20% by weight of each of two types of polymeric components which have different solubility characteristics.

6. A process acording to claim 1 wherein the amphipathic copolymer is a graft copolymer in which a multiplicity of soluble components is attached to an insoluble backbone, the total weight of soluble components not exceeding 67% by weight of the total molecule.

References Cited

UNITED STATES PATENTS 3,317,635   5/1967   Osmond _____ 260—34.2

ALLAN LIEBERMAN, Primary Examiner

U.S. Cl. X.R.

260—29.1